INVENTORS
ROY F. UDELL
WAYNE W. WASKA
BY Beale and Jones
ATTORNEYS

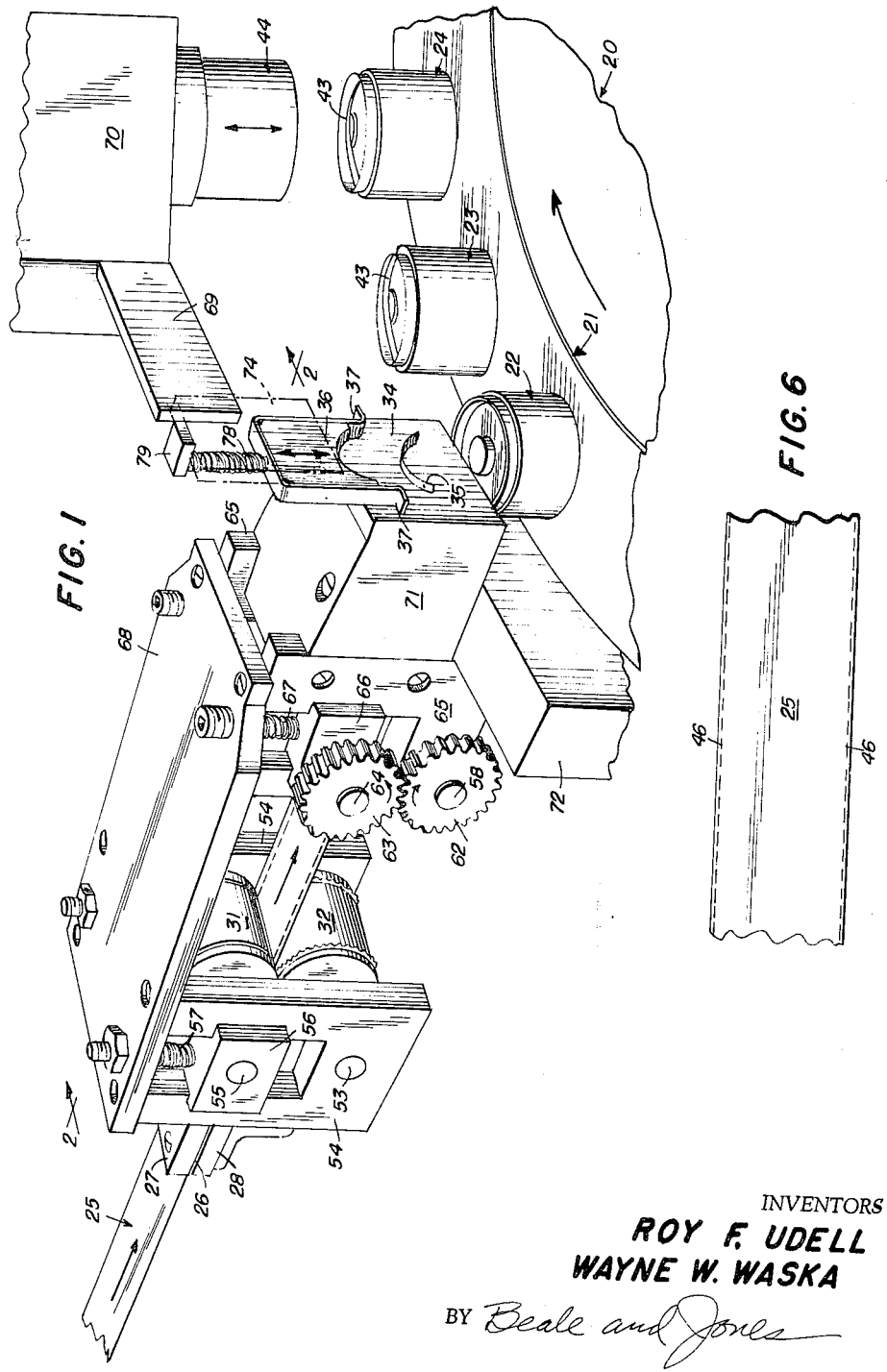

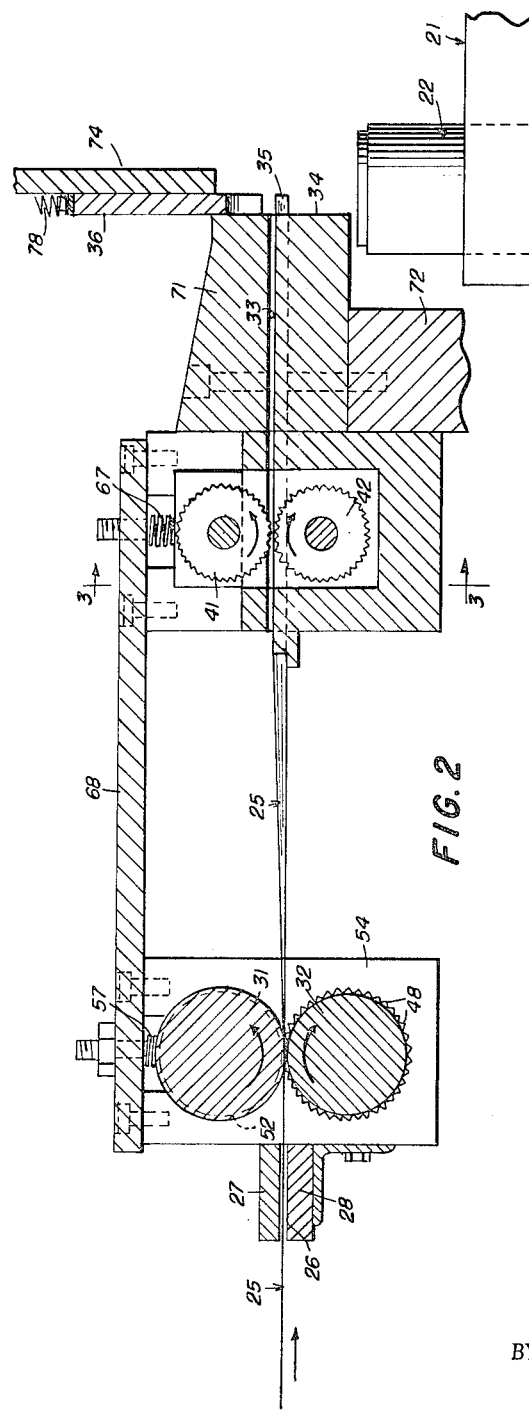
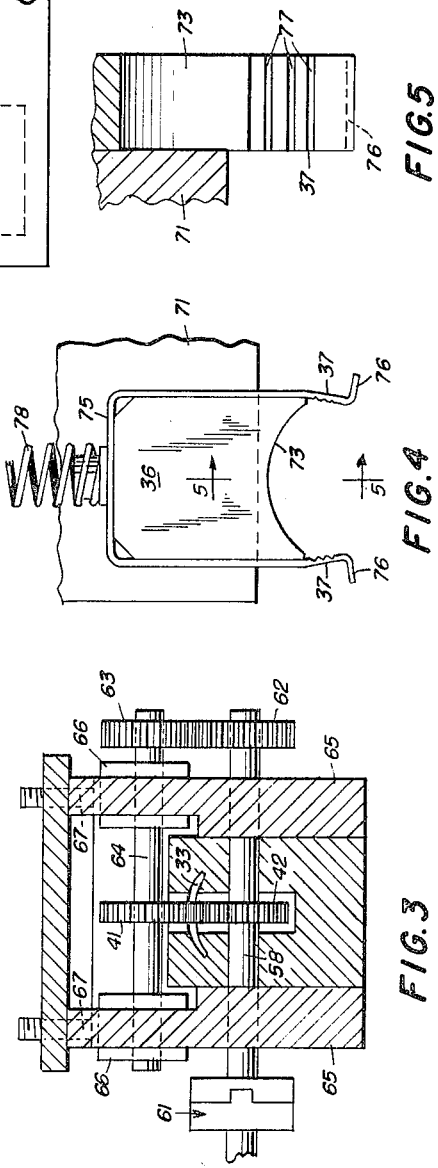

Nov. 30, 1965 R. F. UDELL ETAL 3,220,885
METHOD AND APPARATUS FOR PRODUCING A FRANGIBLE
PROTECTIVE WEB OVER BATTERY TERMINALS
Filed Dec. 11, 1961 4 Sheets-Sheet 4

INVENTORS
ROY F. UDELL
WAYNE W. WASKA
BY Beale and Jones
ATTORNEYS

United States Patent Office 3,220,885
Patented Nov. 30, 1965

3,220,885
METHOD AND APPARATUS FOR PRODUCING A FRANGIBLE PROTECTIVE WEB OVER BATTERY TERMINALS
Roy F. Udell, Sun Prairie, and Wayne W. Waska, Madison, Wis., assignors to The Electric Storage Battery Company, Philadelphia, Pa., a corporation of New Jersey
Filed Dec. 11, 1961, Ser. No. 158,234
25 Claims. (Cl. 136—1)

This invention relates to a method of and apparatus for producing a frangible protective seal from a web of nonconductive seal material and fastening such seal over a terminal of a battery or dry cell. By the term battery is meant, and the invention is applicable to, any type of cell or combination of cells functioning as a unit, whether wet or dry, primary or secondary.

It has been found desirable to insure that a newly purchased battery is in fact new and unused by fastening a frangible protective seal across one of the terminals of such battery, covering the terminal so that the seal must be broken in order for the battery to be put into normal use. It is essential, in performing such an operation upon a mass produced item such as a battery, not only that the seal be reliably fastened, yet frangible, but that the additional cost be kept low in order that the battery remain competitive. To keep the cost of such an operation down, the sealing operation, and the apparatus for performing that operation, should be as simple and reliable as possible, and should be usable in conjunction with already existing battery fabricating machinery and techniques.

It is desirable, in order that the purpose of the seal may not be defeated, that the ends of the seal be firmly anchored in the battery structure so that they cannot be pulled free without tearing the seal, that the battery cannot be used with the seal intact and covering a terminal, and that the seal material be sufficiently inelastic so that it may not be stretched away from its terminal covering position far enough to permit battery operation without the seal being ruptured. It is an additional object of this invention to provide a method and apparatus for providing a battery with such a tamper-proof seal.

This invention will be described with reference to placing such a seal over the axial terminal of a cylindrical dry cell battery, but is of course not limited thereto. The top of a dry cell battery usually comprises a generally horizontal top closure which is flat or almost flat, and from which project upward one or more battery terminals. The upper edge or periphery of the surrounding battery side wall is usually crimped down over the edges of this top closure. This crimping operation normally is performed at one station, usually the last, of a multi-station assembly line through which the incomplete batteries move as the various assembly steps are performed upon them.

According to this invention, a web of seal material is advanced toward and above a dry cell in an assembly line at a point prior to the crimping of the side wall structure over onto the top closure; an individual seal is severed from the web and placed upon the top of the battery over at least one of its terminals; and the side wall structure is subsequently crimped over onto the top closure, clamping the edges of the individual seal between the crimped over upper side wall periphery and the top closure.

The method and apparatus of this invention may be better understood by reference to the following detailed description of a preferred embodiment thereof, which is taken in conjunction with the drawings in which:

FIG. 1 is a general perspective view of an apparatus embodying my invention, showing it in situ in relation to the battery assembly line;

FIG. 2 is a section taken along line 2—2 of FIG. 1;

FIG. 3 is a section taken along line 3—3 of FIG. 2;

FIG. 4 is an enlarged elevation of the cutter blade with its attached spring fingers;

FIG. 5 is a section taken along line 5—5 of FIG 4;

FIG. 6 is a plan view of a portion of the web of seal material, showing two rows of friction enhancing pierced holes;

Figure 18:
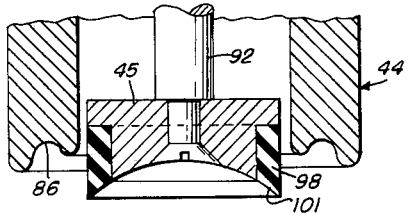
Figure 19:
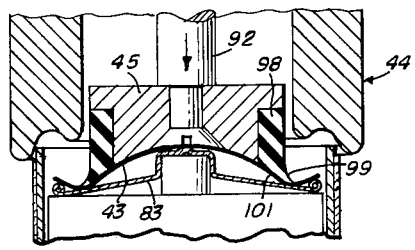
Figure 11:
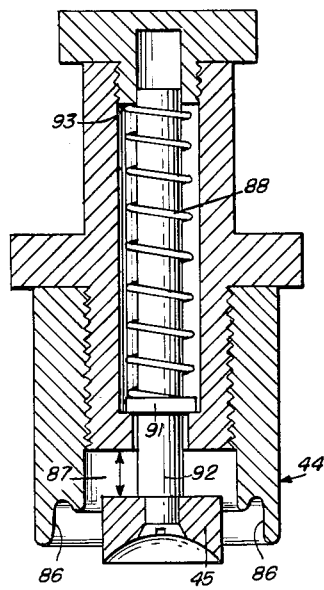
FIG. 11 is a section through the closing die and hold-down pad.
Figure 12:
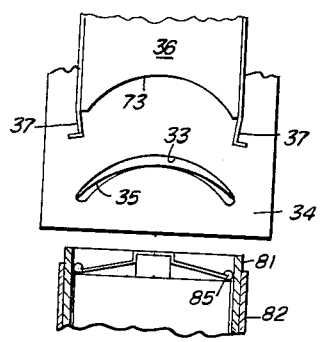
FIGS. 12 through 16 show the sequence of operations upon the top of a dry cell.
Figure 13:
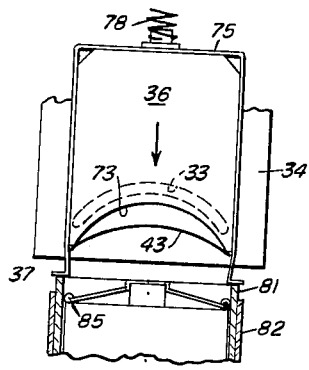
Figure 14:
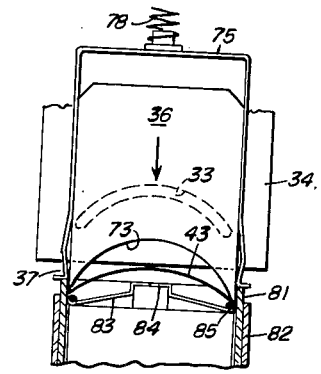
Figure 15:
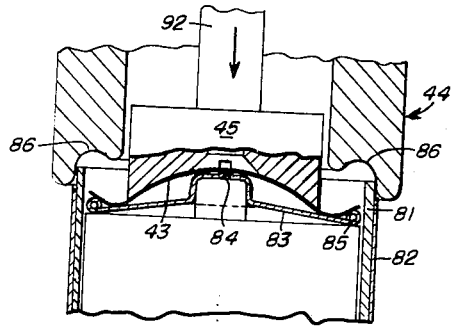
Figure 16:
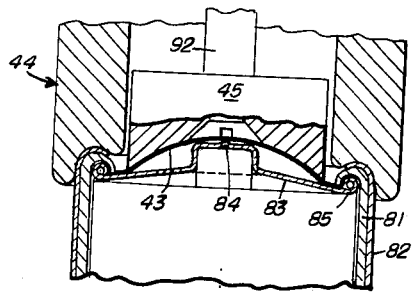
Figure 17:
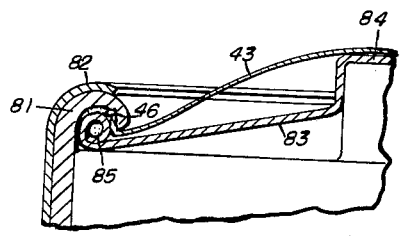

FIGS. 12 through 14, illustrating the cutting and placing of a seal, show a section through the upper portion of the dry cell and a detailed elevation of the portion of the machine located directly above the dry cell, namely, the end of the forming slot, the vertical wall into which it feeds, and the cutter blade and cooperating spring fingers;

FIGS. 15 and 16, illustrating the crimping operation, show a section through the upper portion of the dry cell and a partial section of the closing die and hold down pad;

FIG. 17 is a greatly enlarged sectional detail showing the precise configuration of the end of the seal anchored between the battery side wall structure and the top closure;

FIG. 18 is a section through the bottom of the closing die and the hold-down pad, showing a slightly different modification of the hold-down pad than that shown in FIG. 11;

FIG. 19 is a section through the upper portion of the dry cell and a partial section of the closing die and hold-down pad, illustrating the crimping operation; it is similar to FIG. 15, but shows a slightly different modification of the hold-down pad than that shown in FIG. 15.

*General description of operation*

A portion of an existing battery assembly machine is shown generally as 20 in FIG. 1 as having a circular battery carrier 21 which carries the cylindrical dry cell batteries 22, 23 and 24 mounted therein in a clockwise direction through various work stations at which assembly operations are performed.

The overall operation of the machine embodying our invention may be understood by following the path of the web of seal material 25 as it progresses through the machine, with reference to FIGS. 1 and 2. The web of seal material 25 is normally pulled from a roll of material, which is not shown in the drawings. It first advances through a slot 26 formed by two blocks 27 and 28. It then moves between a pair of rollers 31 and 32 by means of which two rows of friction enhancing pierced holes, whose function will be described later, are produced along the edges of the web. It then proceeds into enclosed forming channel 33 which has a crescent-shaped cross section, as may be seen most clearly in FIG. 3, and in which the web is formed so that in cross section it makes a convex upward arc. Channel 33 ends in, and opens into, smooth vertical wall 34 at a point centrally above the top of battery 22. As the arc-shaped end 35 of web 25 projects from wall 34 a distance equivalent to the desired width of a seal, knife blade 36 moves in a descending vertical path along wall 34, transversely severs the projecting end 35 of the web to form an individual seal 43, and, continuing its downward motion, places seal 43 upon the top of battery 22. Spring fingers 37, which project below blade 36, restrain the severed individual seal 43 in its arcuate position from the point of severance until it is placed upon the top of the battery. Advancing rollers 41 and 42, shown in FIG. 2, grip web 25 between them within channel 33 and pull the web through the machine. Battery 23, shown in FIG. 1, with seal 43 already placed upon it, is located between the seal placing and sidewall crimping stations. Battery 24, with its seal 43 having been placed, has been advanced by battery carrier 21 to a point immediately below closing die 44. Hold-down pad 45, which is located concentrically within closing die 44, and which may be seen in FIG. 11, will descend and clamp seal 43 near its ends; and closing die 44 will then descend and, in completing the closure of the battery, anchor the seal in a manner to be described below.

Detailed description

The seal material must be frangible, must be nonconductive, must be sufficiently flexible to permit its deformation as required by the particular embodiment of the seal forming apparatus used and as required to assume the terminal-covering position for the particular battery to be used, and yet must be sufficiently inelastic so that it cannot be stretched away from the terminal which it covers far enough to permit access to the terminal and use of the battery without breaking the seal. Any material which has these characteristics may be used for the seal. However, the characteristics of the seal material, such as its resilience and toughness, will determine to some extent the particular modification of the inventive method and the particular configuration of the apparatus to be used. A plastic covered paper has been found satisfactory as a seal material, and the specific embodiments discussed herein are designed for the use of such a seal material. Some omissions of or changes in steps of the inventive method, and portions of the apparatus, for use with other seal materials, will be pointed out below.

Where a smooth seal material, such as plastic coated material, is used, it is helpful, and may be necessary, to use friction augmenting means at the edges of the seal which are to be anchored between the battery top closure and crimped over side wall, in order that the seal end may not be pulled out. This frictional augmentation is provided in the embodiment discussed here by two rows of small pierced holes 46, one row adjacent each edge of web 25, with the rows of pierced holes being in that portion of the web which will be, in the individual seals, clamped between the top closure and crimped over side wall structure. These rows of holes 46 may be seen most clearly in the plan view of the section of tape in FIG. 6, and in the perspective view of FIG. 1. These holes are of the type made by piercing the paper or other seal material with a sharp point; the frictional enhancement being obtained by the projection of the displaced material from the surface opposite that on which the piercing instrument entered. They are to be distinguished from holes in which the hole material is removed, as in the holes separating stamps, commonly called "perforations," and the holes cut by a paper-punch.

Figure 7:
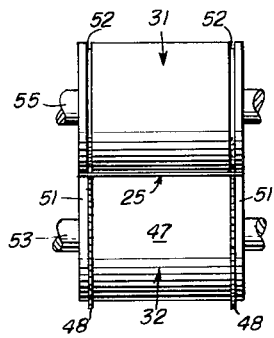
FIG. 7 is a detailed elevation of the pair of rollers which produce friction enhancing pierced holes.

These rows of pierced holes 46 are produced in the embodiment described by passing the web 25 between piercing rollers 31 and 32, which may be seen in situ in FIGS. 1 and 2, and in more detail in FIG. 7. The lower roller 32 may be seen in FIG. 7 to comprise a central cylinder 47, two piercing discs 48, edged with teeth, and two outer discs 51. The piercing discs 48 are clamped between central cylinder 47 and the outer discs 51 by any convenient means. The upper roller 31 has two peripheral grooves 52 near its end into which fit the circumferential teeth of piercing discs 48. Roller 32 turns upon shaft 53 whose ends are mounted in the lower portion of U-shaped brackets 54. Shaft 55, on which roller 31 turns, is mounted at its ends on blocks 56 which are slidably mounted for vertical motion in the cut-out portion of U-shaped brackets 54. Springs 57 bias blocks 56, and consequently roller 31, downwardly, squeezing web 25 tightly between the rollers and causing the teeth on piercing discs 48 to penetrate.

While the pair of rollers 31 and 32, providing a row of pierced holes on either side of the web as described above, constitute a convenient method of obtaining frictional enhancement for the edges of the individual seals, the invention contemplates the use of more than one row of pierced holes on either side of the web, or pierced holes arranged in configurations other than straight lines, any of which may be applied by rollers of the proper configuration or by any other suitable means. It is also possible, and may be convenient, to obtain the needed or desired enhancement by providing indentations, rather than pierced holes, at either side of the web, which indentations cause displaced portions of the sealed material to project from one surface of the seal. Such indentations could be provided in any of the configurations discussed above for pierced holes. Should a seal material be used whose surfaces are rougher than the plastic coated paper used here, it may not be necessary to provide any additional frictional enhancement for the ends of the seals, in which case this step in the method may be eliminated, as well as the appropriate structure in the apparatus.

Advancing rollers 41 and 42 grip web 25 between their scored peripheries. The configuration and mounting of these rollers may be seen in FIGS. 2 and 3. Lower advancing roller 42 is fixed to shaft 58, which is preferably driven via clutch 61 from the battery assembly machine 20. Pinion 62, fixed to the end of the shaft 58, drives cooperating pinion 63 on the end of shaft 64 to which upper advancing roller 41 is attached. Neither the particular take-off means for obtaining the drive from battery assembly machine 20, nor the particular configuration of clutch 61, are a part of this invention; but the motion transmitted to shaft 58 is preferably an intermittent drive synchronized with the intermittent motion of battery carrier 21, such that during each period of motion the web 25 is advanced a distance equivalent to the width of one individual seal. The location of the advancing rollers in the apparatus is not important; they are shown in this embodiment placed so that they grip web 25 at a point within forming channel 33. Shaft 58 is mounted in the lower portion of U-shaped brackets 65; and shaft 64 is mounted in blocks 66 which are slidably mounted for vertical motion in the cut out portions of brackets 65. Springs 67 bias blocks 66 downwardly and cause roller 41 to press tightly against roller 42, gripping the web 25 between them. Bracket 65, as well as brackets 54 which mount piercing rollers 31 and 32, are rigidly attached to top plate 68. It should be noted that the particular configuration of advancing rollers 41 and 42 is not necessary to this invention; in fact, the web 25 may be advanced by any means, with or without rollers.

Forming channel 33 is formed in block 71, which is shown here for simplicity as being monolithic, although for practical purposes it would probably be made up of several sections. U-shaped brackets 65 are shown bolted to block 71 which in turn is shown bolted to a portion 72 of the battery assembly machine structure, shown fragmentarily in FIGURES 1 and 2.

Crescent-shaped forming channel 33 terminates in, and opens into, smooth vertical wall 34, forming a face of block 71. The shape of the channel 33 as it opens into wall 34 may be seen best in FIGURE 12, which also shows clearly the position of the formed web 25 within channel 33. As web 25 advances in synchronism with the advancing movement of the dry cells through assembly machine 20, a formed end 35 of web 25 is caused to project from wall 34 a distance equivalent to the width of one individual seal, each time a new dry cell appears in the assembly machine station immediately beneath wall 34. The purpose of the crescent shaped forming channel 33 is to give the end of projecting web 25 an arcuate, convex upward shape. It is understood that channel 33 need not be crescent-shaped in order to effect this desired shape of the end of the web; any shape of channel may be used which will constrain web 25 so as to form the desired arcuate, convex upward shape. In fact, with certain types of seal material, as is explained below, it may not be necessary to use a forming channel at all.

As each successive dry cell battery moves into the assembly line station in which the seal is to be placed, that is, moves into the station directly underneath the opening of channel 33 into wall 34, web 25 has been advanced a distance sufficient to cause the end of the web to project from wall 34 a distance equivalent to the width of an individual seal. Thus, referring to FIG. 1, as dry cell battery 22 is positioned under wall 34, the end 25 of web 25 projects from wall 34 at a point directly above battery 22. Knife blade 36 is mounted for vertical movement along the smooth face of wall 34, and severs the projecting end 35 of web 25, thus forming an individual seal, and with the same downward motion places that individual seal upon the top of battery 22. A detail of the knife may be seen in FIGURE 4 and the sequence of operations involved in severing the individual seal and placing it on top of the battery may be followed in FIGURES 12 through 14. The arcuate shape which web 25 has assumed in channel 33 may be seen in FIGURE 12. Knife blade 36 shows an edge 73 of arcuate shape; the arc of the blade edge being sharper, that is having a smaller radius, than the arc assumed by web 25 in channel 33. When knife blade 36 moves down along face 34, because of the sharper arc of cutting edge 73 it contacts web 25 first at its edges, thus severing individual seal 35 by shearing it from web 25 transversely, starting with the edges and proceeding into the center of the web. Because the thickness of the bottom of blade 36 is roughly equal to the width of the individual seal, the descending blade edge will tend to carry the severed portions of the seal downwardly.

It will be obvious that when web 25 consists of a fairly resilient material, such as the plastic coated paper used in this embodiment, the resilience of the material will cause the severed individual seal 43 to tend to return to its previous flat condition and thus to spring away from the arcuate cutting edge 73 of knife blade 36. To prevent this, and to cause the arcuate shape of the severed seal 43 to be retained while it is being placed upon the top of the battery, an inverted U-shaped bracket 75 of spring material is placed around knife blade 36 with its ends 37, which project beyond the end of knife blade 36, forming seal retaining spring fingers. As will be seen most clearly in FIG. 4, the projecting fingers 37 are bent slightly inwardly and then terminate in outwardly flared horizontal flanges 76. The inner faces of the spring fingers have vertically spaced horizontal grooves 77, which may be seen most clearly in FIG. 5. After the individual seal 43 is severed from web 25, it springs away from the shearing edge 73 of knife blade 36 and its ends catch in the horizontal grooves 77 of spring fingers 37, as may be seen in FIG. 13. Seal 43 is thus retained in an arcuate, convex upward configuration after it is severed from web 25.

Bracket 75 is not fixedly attached to knife blade 36. It hugs the periphery of blade 36 because of the resilience of its spring material and the in-turned spring fingers 37. In addition, it is biased downwardly by spring 78, which causes it to retain its position tightly against blade 36. The other end of spring 78 is attached to block 79, which is in turn rigidly attached to block 74, upon which blade 36 is mounted. Thus spring 78 forms the only attachment of bracket 75 to the rest of the apparatus (see FIG. 1).

Referring now to FIG. 13, it will be seen that as blade 36 and bracket 75 in combination descend during the cutting stroke, carrying seal 43 with them, the horizontal flanges 76 at the end of spring fingers 37 contact the upstanding periphery of the battery side wall structure. The dry cells shown in the embodiment described here are of the cylindrical type and have a side wall structure consisting of an inner insulating jacket 81 and an outer metallic jacket 82 (see FIGS. 12–17). The inner insulating jacket 81 extends up above the outer metallic jacket 82, and it is the upper periphery of this insulating jacket upon which flanges 76 impinge during the downward stroke.

With flanges 76 bearing upon the top of insulating jacket 81, the downward motion of bracket 75 is arrested, and the continued downward thrust of knife blade 36 spreads fingers 37 apart, and blade 36 moves downwardly relative to the now stationary bracket, as may be seen most clearly in FIG. 14. The ends of cutting edge 73 push the ends of seal 34 off of spring fingers 37 and push them downward until they are resting inside of insulating jacket 81 and upon top closure 83 in the position shown in FIG. 14. Top closure 83 may be seen to have a generally shallow conical shape, with an upwardly projecting center terminal 84 and an upturned peripheral bead 85. The ends of seal 43 rest upon the top of bead 85 and the seal is constrained in a convex upward configuration by the pressure exerted by its resilience against the inner wall of insulating jacket 81. Blade 36 then returns upward to its original position and the bias of spring 78 forces bracket 75 back down into its original position on blade 36.

The source of driving power for knife blade 36 is not of particular importance. Its only requirement is that the cutting motion take place during that portion of the operation of the assembly line in which the batteries are stationary. It is preferably obtained from the drive which already exists in assembly machine 20 for the reciprocal vertical movement of the closing die. It is shown in FIG. 1 as conveniently attached to the structure supporting closing die 44. The knife blade 36 is attached to block 74 (shown dotted in order not to obscure the view of the front of the knife blade), which is in turn fixedly attached to beam or bar 69 which extends from structure 70, shown fragmentarily, which supports die 44.

While the detailed structure of forming slot 33, knife blade 36 and bracket 75 with spring fingers 37 used in this embodiment provide a convenient structure for severing the seal and placing it upon the battery, the concept of this invention is by no means limited to them. Thus, as mentioned earlier, it would be possible to obtain an arcuate seal configuration without the use of a forming channel, by severing the end of a flat web by shearing it from the outside inwardly, and carrying the outside sheared edges downward as the shearing operation continues inward to the center of the web. The shearing operation, either with a formed web as in this embodiment, or with a flat web as just discussed, could be conducted with a blade having a cutting edge of various configurations, not necessarily arcuate, as long as the cutting edge configuration were such that the outer portions of the web were sheared before the center. Using a formed arcuate web as in this embodiment, it is not even necessary that the cutting edge configuration of the knife blade shear from the outer edges inward; it is feasible to use a cutting edge configuration having an arc essentially the same as the arc made by the formed web, in which case the entire cut would be made essentially simultaneously. It is not necessary that the shearing of the individual seal from the web be made with a downward thrust of a knife blade, as in this preferred embodiment; the invention contemplates severance by a shear from any direction, from below, from either side, etc.

After seal 43 has been placed upon the top closure the dry cell battery is moved along the assembly line to a position immediately beneath closing die 44. This may be seen clearly in FIG. 1, where dry cell 24 may be seen positioned immediately below closing die 44 ready to have its upper side wall periphery crimped over onto its top closure. Closing die 44 is connected to a structure 70 shown fragmentarily in FIGURE 1. The vertical reciprocating motion which drives structure 70 and closing die 44 is normally part of the battery assembly machine 20 and forms no part of this invention. Closing die 44 and hold-down pad 45, located concentrically within it, may be seen most clearly in the sectional view of FIG. 11 and a fragmentary section of the die and a partial section of the bottom of the hold-down pad may be also seen in the two sequential FIGS. 15 and 16. Forming die 44 has a formed, annular bottom surface 86 for crimping the battery side wall structure onto the top closure. Hold-down pad 45 is a squat cylinder with an inverted cup-shaped bottom surface, whose cross-section forms a convex upward arc of the shape desired for the seal after it has been anchored in place. This pad is mounted concentrically within forming die 44, so that in its normal position, as shown in FIG. 11, it extends slightly below the bottom of the forming die. It is spring biased toward its normal position and may move against its spring bias up into recess 87 within the closing die. The particular manner in which the spring biasing is accomplished is not critical. In this embodiment spring 88 is compressed between annular boss 91 on shaft 92 to which hold-down pad 45 is attached, and shoulder 93 formed on the forming die internal bore.

The method of operation of hold-down pad 45 and forming die 44 may be seen in the sequence of FIGS. 15 and 16. Forming die 44 and hold-down pad 45 move downward together toward the top of the dry cell battery located immediately beneath. Hold-down pad 45, which extends below closing die 44, contacts seal 43 first. The annular edge of the bottom surface of hold-down die 45 contacts the seal inwardly of the upstanding peripheral bead 85 and forces it down against the surface of top closure 83, with the inner portion of the seal being formed against the cup-shaped under surface of the pad, as shown in FIG. 15. The ends of the seal no longer form a part of the general arcuate shape but extend, as seen in FIG. 15, from the point where the pad presses the seal tightly against the top closure surface outwardly and upwardly to rest upon the top of bead 85. As closing die 44 continues its downward stroke, hold-down pad 45 remains stationary. While the hold-down pad retains the seal in its desired arc, pressed tightly against the top closure, closing die 44, moving downwardly against the bias of spring 88, crimps the battery side wall structure over onto the top of the top closure, anchoring the ends of this seal between the side wall structure and the top closure, as may be seen in FIG. 16. Closing die 44 then retracts upwardly, and the spring bias forces hold-down pad 45 back to its normal position.

A modified form of hold-down pad 45 is shown in FIG. 18. In this modification the outer portion of pad 45 is formed by a sleeve 98 of rubber or other resilient material. The curved bottom surface 101 of sleeve 98 forms the periphery of the cup-shaped bottom surface of pad 45. The operation of this modified form of pad 45 in the clamping of seal 43 may be seen in FIG. 19, which is analogous to FIG. 15, using the other type of pad. When pad 45 descends to clamp seal 43, the resilient material deforms and spreads when it is pressed against the top of the battery, and the spread portion 99 grips seal 43, pulls it tightly over terminal 84 and pushes the ends of seal 43 outwardly to ensure that they will be in position to be clamped by the crimped over sidewall structure when closing die 44 descends.

FIG. 17, shows, in greatly enlarged detail, a view of one end of the seal 43 in its final configuration, crimped between insulating jacket 81 and upstanding bead 85 of top closure 83. It is obvious, of course, that the use of the upstanding bead 85 or any upturned edge on the top closure periphery is not essential to the invention, since the ends of the seal could also be anchored by being clamped between the insulating jacket and the flat upper surface of a top closure having no upturned periphery. It will be noted in FIG. 17 that the material displaced in pierced holes 46 projects from the surface of the seal adjacent to insulating jacket 81 rather than from the surface adjacent to the normally metallic bead 85. This, of course, is in order to take advantage of the greater friction to be obtained by the abutting of such projections against a surface of cardboard or the like rather than against a metal surface. The projection of the seal material at holes 46 is considerably exaggerated in order that the projection may be shown at all. As was noted before, insulating jacket 81 is normally somewhat longer than outer metallic jacket 82, and it is preferable that the ends of seal 43 project far enough underneath insulating jacket 81 so as to be encompassed beneath the arc of crimped over metallic jacket 82, thereby increasing the tightness or firmness of the anchoring of the ends of the seal by virtue of the greater rigidity of the crimped metallic member.

While the plastic coated paper described in this embodiment as being used for seal material is excellent from the standpoint of appearance and durability, it is rather tough and difficult to tear. Where such a tough material is used, it has been found helpful to weaken the seal in places to facilitate tearing. This weakening may be accomplished by putting holes, perforations or indentations in the seal, preferably one or more rows of holes, perforations and indentations extending across the seal.

Figure 8:
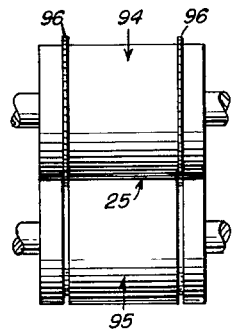
FIG. 8 is a detailed elevation of the pair of rollers which produce tear facilitating holes.
Figure 9:
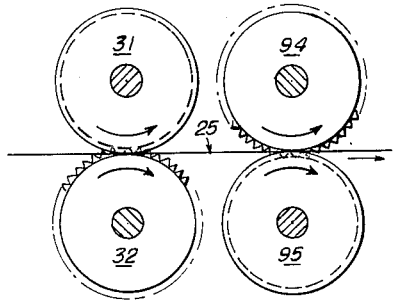
FIG. 9 is a somewhat schematic cross-section of the two pairs of rollers shown in FIGS. 7 and 8, shown in the positions relative to each other which they would occupy in the machine.
Figure 10:
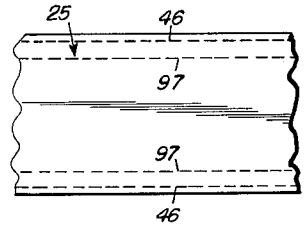
FIG. 10 is a plan view of a portion of seal material web showing two outer rows of friction enhancing pierced holes and two inner rows of tear facilitating holes.

The use of perforating rollers 31 and 32 to put two rows of friction-enhancing pierced holes 46 in the web of seal material has already been described. Additional rows of holes, perforations or indentations for weakening and tear facilitating purposes may be conveniently placed in the web by the addition of another pair of rollers similar to rollers 31 and 32. A pair of suitable rollers, comprising an upper roller 94 and a lower roller 95, is shown in FIG. 8. These are similar to rollers 31 and 32, used for applying the friction augmenting pierced holes, except that the piercing discs 96 are located on the top roller, rather than the bottom, and are placed inwardly of similar discs 48 used for friction enhancement. These additional seal weakening rollers 94 and 95 may be positioned anywhere in the apparatus ahead of the severing knife. They may be conveniently mounted upon the apparatus in a manner similar to that described above for friction enhancing rollers 31 and 32, and located on the apparatus adjacent to those rollers and so as to contact web 25 just after it has been contacted by those rollers. FIG. 9 shows in a rather schematic way a cross-sectional view of the two sets of rollers as they might be positioned with respect to each other and web 25. FIG. 10 shows a section of web 25 as it would appear after having passed through the two sets of rollers, with outer rows 46 of friction enhancing pierced holes and parallel inner rows 97 of tear facilitating pierced holes. The use of two spaced rows of the holes 97 as shown in FIG. 10 defines an inner, easily removed section in the final transversely severed individual seal. It will be apparent that these holes are not limited to pierced holes, but may be holes of the type referred to as "perforations" where the hole material is removed rather than left projecting from the surface of the web, or may be indentations, or anything which will result in weakening the seal or facilitating tearing it. Also, the weakening holes or perforations are not limited to the configuration shown in FIG. 10; it is within the contemplation of this invention that only one row of weakening holes or indentations be used, or two or more rows closely spaced, so that the seal is ruptured essentially only at one point, and is then folded back away from the terminal to permit normal use of the battery. The invention also contemplates the use of holes or indentations in configurations other than straight rows, as long as they result in facilitating the tearing of the seal.

In the embodiment of the invention described above in detail, the severing and placing of the seal, and the crimping over of the battery side wall structure, have taken place at two separate stations in a dry cell assembly line. That is the preferred configuration. However, it is feasible, and within the contemplation of this invention, that the placing of the seal upon the top closure of the dry cell battery and the subsequent crimping over of the battery side wall htructure to anchor the seal be performed successively at the same assembly line station, or upon a battery which has not changed position and which need not be a part of an assembly line as such. Means and methods for accomplishing this, such as mounting the severing and placing means and the crimping means for rotary or reciprocatory motion such that they will be brought into position over the battery successively, will be apparent to those skilled in the art and therefore details of such a modification will not be given here.

It will be apparent from the foregoing description that this invention comprises an apparatus and method for applying protective seals to dry cell batteries which are adaptable for use with existing battery assembly machines and provide a battery seal which is essentially tamperproof.

We claim:

1. The method of forming a protective seal and placing it over a battery terminal, comprising: positioning the end of a web of seal material above a battery; and with one motion of a cutting edge, severing an individual seal from the web and forming said seal into a generally arcuate convex upward configuration; and placing the seal upon the top of the battery in a position to cover at least one terminal.

2. The method of forming a protective seal and placing it over a battery terminal, comprising: positioning the end of a web of seal material above a battery, transversely severing an individual seal from the web, forming said seal into a generally arcuate convex upward configuration, and placing the seal upon the top of the battery in a position to cover at least one terminal.

3. The method of forming a protective seal and placing it over a battery terminal, comprising: forming the end of a web of seal material so that it makes, in cross-section, a convex upward arc; positioning the formed end of the web above a battery; and transversely severing an individual seal from the web and placing the seal upon the top of the battery in a position to cover at least one terminal, retaining the severed seal in a convex upward, generally arcuate shape from its severance until its being placed on top of the battery.

4. The method of forming a protective seal and fastening it over a battery terminal, comprising: positioning the end of a web of seal material above an unfinished battery having its upper sidewall extending above its generally horizontal top closure, severing an individual seal from the web; placing the seal upon the top of the battery in a position to cover at least one terminal; and crimping the battery upper sidewall structure over upon the upper surface of the generally horizontal top closure so as to clamp edges of the seal between the sidewall structure and the top closure.

5. The method of forming a protective seal and fastening it over a battery terminal, comprising: positioning the end of a web of seal material above an unfinished battery having its upper sidewall extending above its generally horizontal top closure, severing an individual seal from the web; placing the seal upon the top of the battery in a position to cover at least one terminal; clamping the seal down against the upper surface of the top closure at points on either side of a terminal and inwardly of the edges of the seal; and crimping the battery upper sidewall structure over upon the upper surface of the top closure so as to clamp edges of the seal between the sidewall structure and the top closure.

6. An apparatus for producing a protective seal and fastening it over a battery terminal comprising: a battery holder; means for positioning the end of a web of seal material above a battery positioned in said holder; knife blade means adapted to sever an individual seal transversely from the web and place it upon the top of the battery in a position to cover at least one terminal; means for forming the seal into a convex upward, arcuate shape prior to placing it upon the top of the battery; and means for fastening the individual seal to the battery.

7. The apparatus of claim 6 in which there is attached to said knife blade means a seal engaging means adapted to maintain the severed seal in its arcuate shape and carry the severed individual seal along with the motion of the knife blade toward the top of the battery.

8. The apparatus of claim 7 in which said knife blade means possesses a cutting edge and wherein said seal engaging means comprises a thickness of said knife blade adjacent to said cutting edge.

9. The apparatus of claim 6 wherein said forming means comprises a knife blade means being mounted for vertical motion above said web and having a cutting edge whose ends extend down below its center portion, whereby the severance of said seal from said web commences at the sides of said web and continues in toward the center of said web, with the earlier severed ends of said seal being carried downward below the subsequently severed central portion.

10. The apparatus of claim 6 wherein the forming means comprises a generally horizontal forming channel into which the web is placed, the end of the web to be severed projecting from the end of said channel, the sides of said channel constraining the sides of the web so that the web assumes, in cross-section, a convex upward, arcuate shape.

11. The apparatus of claim 6 having means to retain the severed seal in its arcuate shape from its severance from the web to its placement upon the top of the battery.

12. The apparatus of claim 11 wherein the seal shape retention means comprises two spaced fingers attached to said knife blade means and adapted to contain the seal between them.

13. The apparatus of claim 6 wherein the battery to which a seal is to be attached is cylindrical, having a generally horizontal top closure with a terminal projecting upward from it, and having the upper edge of its peripheral sidewall structure extending above the surface of the top closure, and wherein the seal fastening means comprises a shaped die adapted to crimp the upper edge of the projecting sidewall structure down upon the surface of the top closure so as to anchor each end of the seal between the crimped over sidewall structure and the top closure.

14. The apparatus of claim 13 having a clamping means adapted to clamp the seal in place upon the battery top closure prior to and during the crimping over of the projecting sidewall structure.

15. The apparatus of claim 13 having means for applying friction enhancing protrusions adjacent each edge of the web.

16. The apparatus of claim 6 wherein said battery holder is a part of a multi-station battery assembly line, wherein said holder advances successively through a plurality of stations including a first station and a subsequent second station, said knife blade being mounted at said first station, and said seal fastening means operating upon the battery at the second station.

17. A method of forming a protective seal and placing it over a battery terminal comprising: positioning the end of a web of seal material above a battery; with one motion of a cutting means, transversely severing an individual seal from the web and forming said individual seal into a generally arcuate convex upward configuration; retaining said seal in a generally arcuate convex upward configuration as it is carried toward the battery; and placing said seal upon the top of the battery in a position to cover at least one terminal.

18. The method of forming a protective seal and fastening it over a battery terminal, comprising: positioning the end of a web of seal material above an unfinished battery having at least a top closure and a peripheral sidewall; severing an individual seal from the web; placing the seal upon the top of the battery in a position to cover at least one terminal; and pressing together said top closure and said peripheral sidewall so as to clamp edges of the seal between them.

19. The method of producing and fastening a protective seal for a battery having a top closure and a sidewall comprising: advancing a web of seal material toward and above an unfinished battery assembly positioned in one station of a multi-station battery assembly line, the advancement of the web of material being synchronized with the motion of the batteries through the stations of the assembly line so that a new segment of web, corresponding to an individual seal, is presented above each successive unfinished battery to occupy the station; severing an individual seal from the web and placing it upon the top of the unfinished battery in a position to cover at least one terminal; and finishing the assembly of the battery whereby the ends of said seal are clamped between the top closure and the sidewall of the battery.

20. The method of producing and fastening a protective seal for a battery having a top closure and a sidewall comprising: advancing a web of seal material toward and above an unfinished battery assembly positioned in one station of a multi-station battery assembly line, the advancement of the web of material being synchronized with the motion of the unfinished batteries through the stations of the assembly line so that a new segment of web, corresponding to an individual seal, is presented above each successive unfinished battery to occupy the station; severing an individual seal from the web and placing it upon the top of the battery in a position to cover at least one terminal; advancing the unfinished battery with the seal placed upon it to at least one subsequent station in the assembly line; and at a subsequent station finishing said unfinished battery whereby the ends of said seal are clamped between the top closure and the sidewall of the battery.

21. The method of producing and fastening a protective seal for a battery having a top closure and a sidewall comprising: advancing a web of seal material toward and above an unfinished battery assembly; applying friction enhancing projections adjacent each edge of the web; transversely severing an individual seal from the web and placing it upon the top of the battery in a position to cover at least one terminal; and finishing said unfinished battery assembly whereby the ends of said seal are clamped between the top closure and the sidewall, with the friction enhancing projections being within the clamped area of said seal.

22. The method of producing and fastening a protective seal for a battery having a top closure and a sidewall comprising: advancing a web of seal material toward and above an unfinished battery assembly; applying friction enhancing projections adjacent each edge of the web; weakening the web inwardly of the friction enhancing projections; transversely severing an individual seal from the web and placing it upon the top of the battery in a position to cover at least one terminal; and finishing said unfinished battery structure whereby the ends of said seal are clamped between the top closure and the sidewall, with the friction enhancing projections being within the clamped area of the seal, and with said weakened portion of the seal being adjacent to, but not within, said clamped area of the seal.

23. An apparatus for producing a protective seal and fastening the seal over an unfinished battery having a generally horizontal top closure with a terminal projecting upward from it, and having the upper edge of its peripheral sidewall structure projecting above the surface of the top closure comprising: a battery holder; means for positioning the end of a web of seal material above said unfinished battery positioned in said holder; knife blade means adapted to sever an individual seal transversely from said web and place it upon the top of said unfinished battery in a position to cover said terminal; and a shaped die adapted to crimp the upper edge of the projecting sidewall structure down upon the surface of the top closure so as to anchor each end of the seal between the crimped over sidewall structure and the top closure.

24. The method of forming a frangible insulating seal and fastening it over a battery terminal, comprising: positioning a blank of frangible, insulating seal material above an unfinished battery having at least a top closure and a peripheral side wall, placing said blank upon the top of said battery in a position to cover at least one battery terminal, and while the edges of said blank are between said side wall and said top closure, applying pressure on said top closure and said peripheral side wall so as to clamp edges of said seal between them.

25. In a method of forming a protective seal and fastening it over a battery terminal the improvement which comprises placing a strip of frangible insulating sealing material above at least one terminal of unfinished primary battery which is provided with a generally horizontal top closure and a side wall the upper end of which extends above said closure, placing the edges of said strip of sealing material in the space between the upper end of said side wall and said top closure and pressing said side wall and said top closure together thereby clamping the edges of said seal between the side wall structure and the top closure.

References Cited by the Examiner

UNITED STATES PATENTS

| | | | |
|---|---|---|---|
| 1,780,639 | 11/1930 | Burdick | 53—130 |
| 1,927,212 | 9/1933 | Hawkins | 53—15 |
| 1,932,136 | 10/1933 | Hole | 113—59 |
| 2,003,682 | 6/1935 | Enock | 53—130 |
| 2,516,546 | 7/1950 | Brown | 113—59 |
| 2,803,691 | 8/1957 | Herbert et al. | 136—133 |
| 2,899,782 | 8/1959 | Haidegger | 53—41 X |
| 2,922,832 | 1/1960 | Gottschall et al. | 136—133 |

WINSTON A. DOUGLAS, *Primary Examiner.*

JOHN R. SPECK, BROMNEY SEELEY, *Examiners.*